United States Patent [19]
Wakuta et al.

[11] Patent Number: 5,111,089
[45] Date of Patent: May 5, 1992

[54] COOLING DEVICE FOR A VEHICLE MOTOR

[75] Inventors: Satoru Wakuta, Anjo; Shinichi Otake, Aichi, both of Japan

[73] Assignee: Aisin AW Co., Ltd., Japan

[21] Appl. No.: 690,159

[22] Filed: Apr. 24, 1991

[51] Int. Cl.$^5$ .................. H02K 5/18; H02K 5/20; H02K 9/19
[52] U.S. Cl. .................................. 310/54; 310/64
[58] Field of Search .............. 310/52, 54, 64, 65, 310/89

[56] References Cited
U.S. PATENT DOCUMENTS
| | | | |
|---|---|---|---|
| 3,648,085 | 3/1972 | Fujii | 310/54 |
| 4,138,862 | 2/1979 | Müller | 310/64 |
| 4,262,224 | 4/1981 | Kofink et al. | 310/54 |
| 4,854,373 | 8/1989 | Williams | 310/54 |

FOREIGN PATENT DOCUMENTS
| | | | |
|---|---|---|---|
| 0220809 | 7/1957 | Australia | 310/54 |
| 1136412 | 9/1962 | Fed. Rep. of Germany | 310/54 |
| 0013246 | 1/1990 | Japan | 310/54 |

Primary Examiner—Steven L. Stephan
Assistant Examiner—C. LaBalle
Attorney, Agent, or Firm—Lorusso & Loud

[57] ABSTRACT

A cooling device for a vehicle motor comprises a rotation shaft rotatably supported by a casing assembly, a rotor fixed to the rotation shaft, a stator disposed around the rotor and fixed to the casing assembly, a coil wound around the stator, an oil pump motor disposed at a lower portion of the casing assembly, an oil passage faced to the coil and formed in an upper portion of the casing assembly, a cooling fin formed on a side wall of the casing assembly, a separator plate being in contact with the cooling fin, an oil passage cover combined with the separator plate to form an oil passage therebetween, and a cooling fin formed on the oil passage cover.

2 Claims, 2 Drawing Sheets

FIG. I

COOLING DEVICE FOR A VEHICLE MOTOR

BACKGROUND OF THE INVENTION

1. Field of the Invention

The present invention relates to a cooling device for a vehicle motor used in an electric automobile.

2. Description of the Prior Art

In recent years, in view of environmental problems, electric automobiles have been extensively developed. Such a type using wheel motors has been known that each motor is directly connected to a corresponding wheel through a reduction gear.

In such arrangement that each wheel is directly connected to the corresponding motor through the reduction gear, it is necessary to prevent interference of a vehicle body with the motor and the reduction gear during vertical movements and steering operations of the wheels. This forms a restriction with respect to an installation space. Therefore, it is required to minimize the sizes of the motor and the reduction gear for disposing them in a limited space. Meanwhile, the electric automobiles are required to use motors having small and light structures as well as large output torques so as to obtain high powers relative to the vehicle weights.

However, in order to reduce the sizes and weight of the motor and to increase the output torque thereof, it is necessary to flow a large current through a coil of the motor, so that the coil generates a large amount of heat, which may cause burning of the coil. This is due to the facts that thermal resistance of the coil is large, and the heat resistance of the iron core which serves to transfer the heat to a casing of the motor is also high because the iron core has stacked layers of silicon steel plates, so that, as heating density of the coil increases, the heat accumulated in the coil increases, resulting in a rapid increase of the temperature of the coil. Therefore, it is important to suppress the heating of the coil in the overloaded state for cooling it in order to obtain an intended performance of the motor.

Such a manner for cooling has already been known that a liquid coolant such as oil is held in the motor to directly immerse the coil end in the coolant so that a stirring operation by a rotor may serve to cool the coil.

Since the conventional cooling device, however, is designed to cool the coil only by the stirring of the coolant by rotor, the coil end may not be cooled uniformly, which causes a local heating of the coil and thus reduction of durability of an insulator for the coil, resulting in the burning of the motor. Further, if the amount of the oil is increased so as to fully cool the coil end, the output power of the motor will be reduced due to the stirring resistance against the rotor, and thus a large power loss is inevitable for obtaining an intended power.

Further, due to the restriction on the installation space in the electric automobile described before, it is extremely difficult to find the installation space for the cooling device. Even if the cooling device were disposed under such conditions, the cooling device would interfere with the wheel during a vertical movement and/or steering operation of the wheel.

Accordingly, it is an object of the invention to provide a cooling device for a vehicle motor, overcoming the above noted problems, by which an electric motor can have small size and a high output power.

SUMMARY OF THE INVENTION

A cooling device for a vehicle motor of the invention comprises a rotation shaft (2a) rotatably supported by a casing assembly (1), a rotor (2b) fixed to the rotation shaft, a stator (2c) disposed around the rotor and fixed to the casing assembly, a coil (2d) wound around the stator, an oil pump motor (26) disposed at a lower portion of the casing assembly, an oil passage (31) faced to the coil and formed in an upper portion of the casing assembly, a cooling fin (1c) formed on a side wall of the casing assembly, a separator plate (27) being in contact with the cooling fin, an oil passage cover (29) combined with the separator plate to form an oil passage (30) therebetween, and a cooling fin (29a) formed on the oil passage cover.

According to the invention, for instance, as shown in FIG. 1, the cooling oil is supplied by the oil pump motor 26 from an oil sump 25 through the passage 30 and the upper passage 31, and is injected from injection ports 31a and 31b directly onto the coil 2d of the electric motor 2. In this operation, the hot oil efficiently radiates the heat owing to a large contact surface between the oil and the cooling fins 1c and 29a formed at opposite sides of the passage 30. In the invention, an oil level can be set so as to substantially prevent the immersion of the rotor 2b of the motor 2 in the oil, and thus the motor can have a high output power.

The oil passage cover 29, the oil passage 30 and the separator plate 27 may be disposed at an end portion of the fin 1c formed on the side surface of the casing 1a, in which case the axial size of the cooling device can be reduced to achieve a compact structure, and it can be used also as a cover for a motor rotational position detector 5.

During stoppage of the vehicle, e.g., before starting, hot air between the casing 1a and the separator plate 27 flows upward through an air passage between the fins 1c, as indicated by arrows in FIG. 2, so that the heat radiating effect can be improved during the stoppage of the vehicle.

Therefore, the heat generation of the overloaded coil can be suppressed, and the heat in the coil can be rapidly and efficiently radiated, so that the electric motor can have the reduced size and the high output power.

It should be noted that reference numbers are allotted to the above described structures and components only for reference to the drawings, and are not intended to restrict the invention in any manner.

These and other objects and features of the invention will become more apparent from the following description of preferred embodiments with reference to the accompanying drawings.

DETAILED DESCRIPTION OF THE PREFERRED EMBODIMENTS

Figure 1:
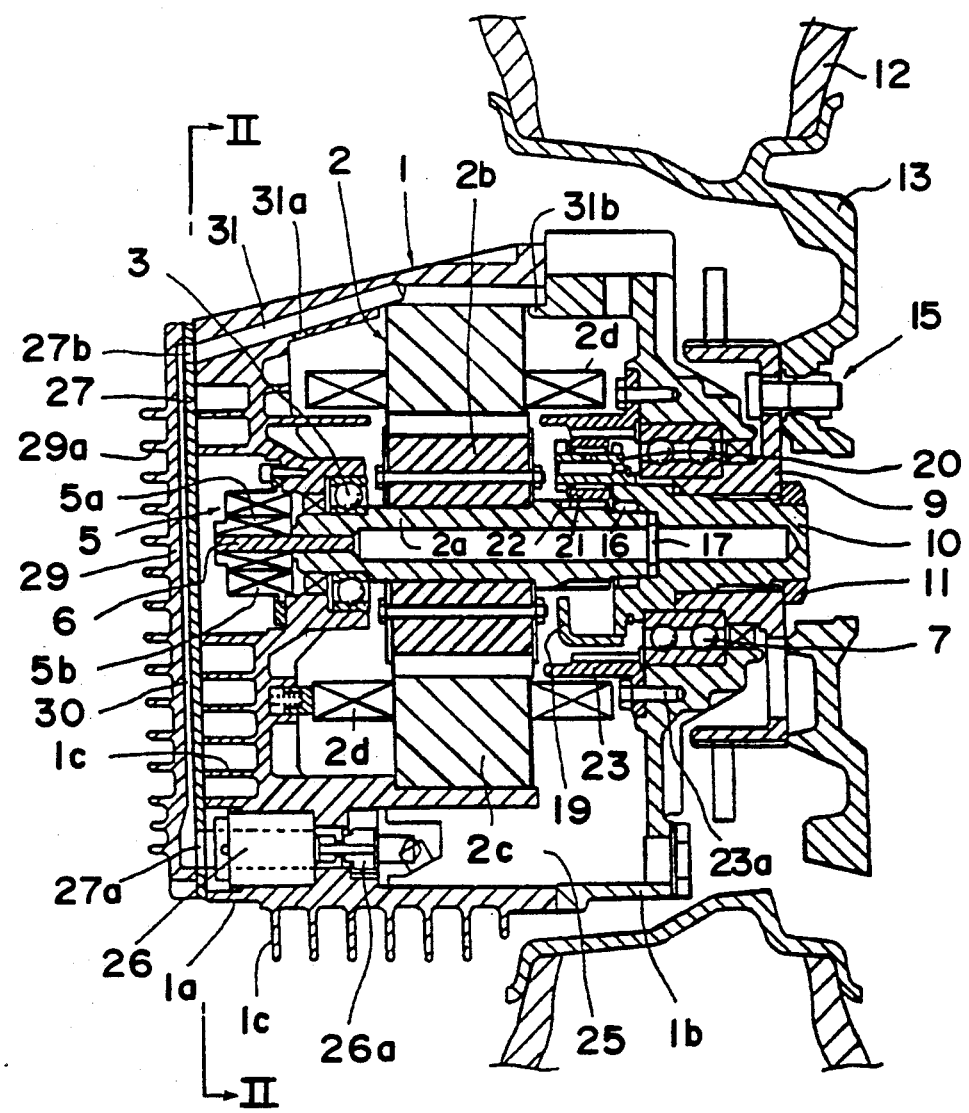
FIG. 1 is a cross section of a cooling device for a vehicle motor of an embodiment of the invention.

Referring to FIG. 1, a casing assembly or main body 1 is of a nearly circular section and has a two-piece structure including casings 1a and 1b which are fixed together by bolts (not shown). The casing 1a is provided at its outer surface with a large number of cooling fins 1c. The casing assembly 1 houses an electric motor 2, of which rotation shaft 2a is supported at its one end by a side wall of the casing 1a through a bearing 3. The electric motor 2 has a rotor 2b fixed to the rotation shaft 2a, a stator 2c facing to the rotor 2b and fixedly fitted into an inner wall of the casing 1a, and a coil 2d wound around the stator 2c.

A motor rotational position detector 5 is disposed on an outer wall of the casing 1a, and is fixed to the rotation shaft 2a by a shaft 6. The motor rotational position detector 5 has a movable part 5a fixed to the shaft 6 and a stationary part 5b fixed to the casing 1a.

A side wall of the other casing 1b rotatably supports a wheel hub 9 through a bearing 7, and an output rotation shaft 10 is splined to the wheel hub 9 and is axially immovably fixed thereto by a nut 11. A wheel 13 carrying a tire 12 is fixed to the wheel hub 9 by bolts and nuts 15.

The output rotation shaft 10 is provided at its left end with a coaxial recess having a circular section, into which the rotation shaft 2a of the motor is fitted and is rotatably supported by bearings 16 and 17. A carrier 19 is attached to the output rotation shaft 10, and a predetermined number of shafts 20 which are equally and circumferentially spaced from each other are supported by the carrier 19 and the output rotation shaft 10. Each shaft 20 rotatably supports a planetary gear 21 which is arranged to permanently mesh with a sun gear 22 formed at the other end of the motor rotation shaft 2a and a ring gear 23 fixed to the inner wall of the casing 1b by bolts 23a. The carrier 19, shaft 20, planetary gear 21, sun gear 22 and ring gear 23 form an epicyclic reduction gear for connecting the rotation shaft 2a of the motor to the output rotation shaft 10.

Further, an oil sump 25 is formed in a lower portion of the casing assembly 1, and an oil pump motor 26 is fixed to a side portion of the casing 1a in such a manner that blades 26a of the oil pump motor 26 are located in the oil sump 25. A separator plate 27 and an oil passage cover 29 having cooling fins 29a are fixed to the outer side of the casing 1a, and an oil passage 30 is formed between the plate 27 and the cover 29. The separator plate 27 is provided with an opening 27a connected to the oil sump 25 and an opening 27b connected to an upper oil passage 31 formed in the casing 1a. The upper passage 31 is connected to injection ports 31a and 31b facing the coil 2d.

Figure 2:
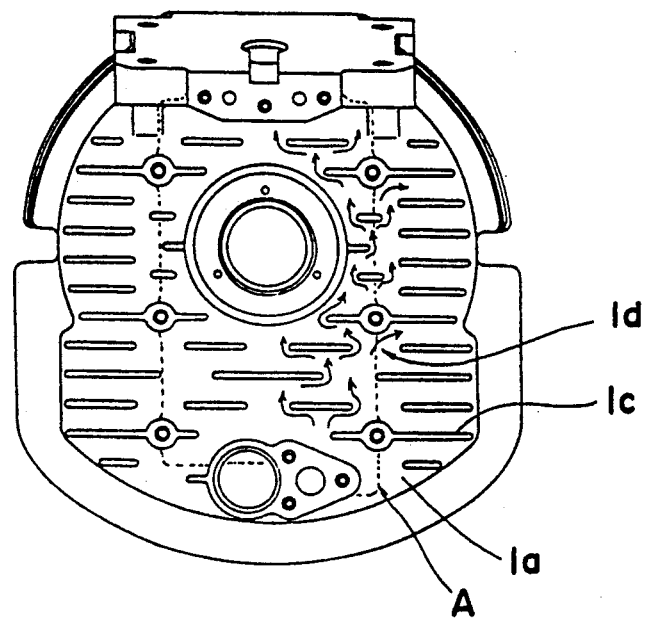
FIG. 2 is a plan of a casing assembly taken along line II—II in FIG. 1.

FIG. 2 illustrates configurations of the fins 1c formed on the casing 1a. The fins 1c are formed laterally with respect to the vehicle advancing direction, and vertically extending air passages 1d are formed between the fins 1c. Dashed lines A indicate the position at which the oil passage cover 29 is attached.

Effect of the invention thus constructed is as follows. The cooling oil is supplied by the oil pump motor 26 from the oil sump 25 through the passage 30 and the upper passage 31, and is injected from the injection ports 31a and 31b directly onto the coil 2d of the electric motor 2. In this operation, the hot oil efficiently radiates the heat owing to a large contact surface between the oil and the cooling fins 1c and 29a formed at opposite sides of the passage 30. In the invention, an oil level can be set so as to substantially prevent the immersion of the rotor 2b of the motor 2 in the oil, and thus the motor can have a high output power.

Although particular preferred embodiments of the invention have been disclosed in detail for illustrative purpose, it will be recognized that other variations or modifications may be made without departing from the spirit and scope of the invention as claimed.

What is claimed is:

1. A cooling device for a vehicle motor comprising:
   a rotation shaft rotatably supported by a casing assembly;
   a rotor fixed to said rotation shaft;
   a stator disposed around said rotor and fixed to said casing assembly;
   a coil wound around said stator;
   an oil pump motor disposed at a lower portion of said casing assembly;
   an oil passage facing said coil and formed in an upper portion of said casing assembly;
   a cooling fin formed on a side wall of said casing assembly;
   a separator plate being in contact with said cooling fin;
   an oil passage cover combined with said separator plate to form an oil passage therebetween; and
   a cooling fin formed on said oil passage cover.

2. A cooling device for a vehicle motor as claimed in claim 1, wherein said cooling fin on said casing assembly forms a vertically extending air passage.

* * * * *